United States Patent [19]
Soneda et al.

[11] Patent Number: 5,192,496
[45] Date of Patent: Mar. 9, 1993

[54] FUEL ASSEMBLY AND UPPER TIE PLATE THEREOF

[75] Inventors: Hideo Soneda; Junichi Yamashita; Yukihisa Fukasawa; Taro Ueki; Sadayuki Izutsu, all of Hitachi, Japan

[73] Assignee: Hitachi, Ltd., Tokyo, Japan

[21] Appl. No.: 724,168

[22] Filed: Jul. 1, 1991

[30] Foreign Application Priority Data

Jul. 4, 1990 [JP] Japan ................... 2-176565

[51] Int. Cl.⁵ .............................. G21C 7/06
[52] U.S. Cl. ..................... 376/428; 376/435; 376/209; 376/210
[58] Field of Search ............. 376/428, 435, 444, 447, 376/370, 210, 221, 209; 976/DIG. 108, DIG. 109, DIG. 233, DIG. 243, DIG. 225

[56] References Cited

U.S. PATENT DOCUMENTS

| | | |
|---|---|---|
| 4,292,128 | 9/1981 | Takeda et al. ............. 376/370 |
| 4,652,426 | 3/1987 | Boyle et al. ............... 376/352 |
| 4,876,062 | 10/1989 | Aoyama et al. ............ 376/444 |
| 4,968,479 | 11/1990 | Ogiya et al. ............... 376/428 |
| 5,068,082 | 11/1991 | Ueda et al. ................ 376/428 |

Primary Examiner—Donald P. Walsh
Assistant Examiner—Meena Chelliah
Attorney, Agent, or Firm—Antonelli, Terry Stout & Kraus

[57] ABSTRACT

The fuel assembly has fuel arrangement of a square lattice of 10 lines by 10 rows. Four water rods having a large diameter are arranged in central region of horizontal cross section wherein arrangement of 12 fuel rods is possible. The four water rods having a large diameter are so arranged adjacently in a circle as to form an internal between each other. First coolant flow path which is extended toward axial direction is formed by surrounded with the water rods having a large diameter. The first coolant flow path leads to third coolant flow path which is formed around the fuel rods through second coolant flow path which is the interval between the water rods having a large diameter.

The fuel assembly is able to optimize the moderator to fuel atom number density ratio and to reduce the pressure loss because a portion to be an excessively moderated region is utilized as the first coolant flow path.

13 Claims, 10 Drawing Sheets

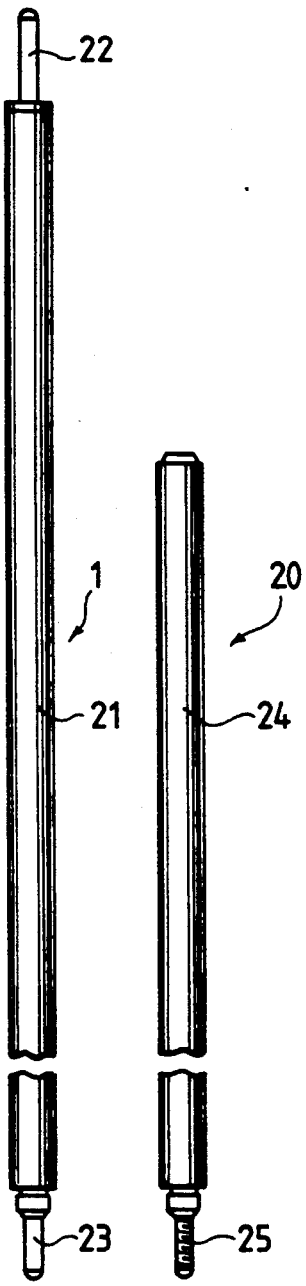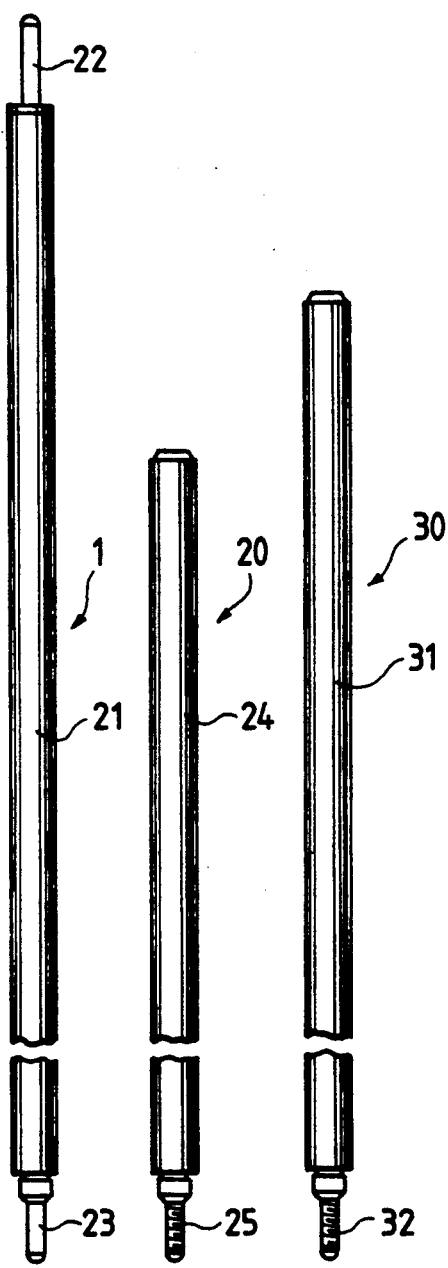

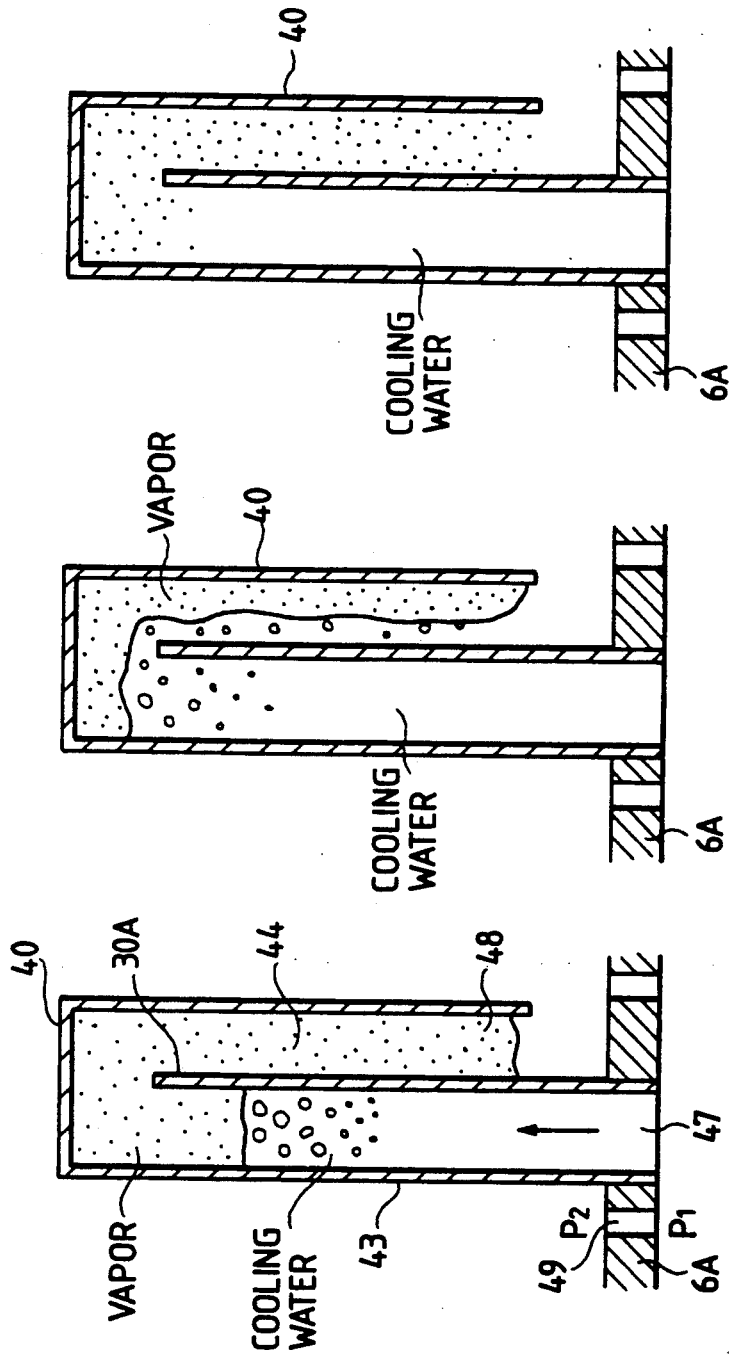

FUEL ASSEMBLY AND UPPER TIE PLATE THEREOF

BACKGROUND OF THE INVENTION

The present invention relates to a fuel assembly and an upper tie plate thereof, and specially to the fuel assembly and the upper tie plate thereof which are preferable for effective utilization of fissile material and achieving high burnup in boiling water reactors.

Improvement of fuel economy is able to achieved by increasing the degree of burnup of the fuel. For increasing the degree of burnup of the fuel, enrichment of uranium 235 in the fuel pellet may be increased. But, increasing of the enrichment without increasing of the moderator to fuel atom number density ratio (H/U ratio) causes hardening of a neutron spectrum. Therefore, an finite multiplication factor of the fuel assembly does not become the maximum value at the enrichment.

FIG. 1 illustrates change of the relation between the H/U ratio and the infinite multiplication factor depending on increasing of the enrichment. For obtaining large infinite multiplication factor with a constant enrichment, it is necessary to achieve the most proper H/U ratio corresponding to the enrichment. That is, when the enrichment is increased in order to improve the fuel economy, the most proper H/U ratio is increased, and accordingly it becomes necessary to increase the number of water rods or to increase a horizontal cross sectional area of the water rods.

And, when the enrichment is increased, power peaking in radial direction of the fuel assembly is increased and linear power density of fuel rod becomes large, and consequently the fuel rod is exposed to a more severe condition.

Further, distribution of voids in axial direction of the reactor core is small at the lower end portion of the reactor core, and is large from the middle to the upper end portion of the reactor core. Therefore, as burning of the fissile material at the upper region of the fuel assembly is retarded, the concentration of uranium 235 becomes higher relatively than that in the other portion. And by effect of the void, fissile plutonium is produced and built up at the upper region of the fuel assembly. According to the reason mentioned above, power peaking becomes high at the upper portion in axial direction of the fuel assembly. As the increasing of the enrichment relates also to the increasing of power peaking in the axial direction, linear power density of the fuel rod becomes large as well, and the fuel rod is exposed to a more severe condition.

On the other hand, a flow rate spectral shift operation of a nuclear reactor is currently considered, in which the void fraction is changed greatly by operating the nuclear reactor with smaller flow rate (the flow rate of the coolant which flows through the reactor core) in the reactor core than the designed flow rate value at the beginning of operation cycle and with larger flow rate in the reactor core than the designed flow rate value at the end of the operation cycle, and fissile plutonium is built up and burnt effectively. In performing the flow rate spectral shift operation, as the power peaking in axial direction becomes large, the linear power density of the fuel rod becomes larger and the fuel rod is exposed to a more severe condition.

Accordingly, in order to decrease the linear power density of the fuel rod and to be sure to maintain thermal margin, it is necessary to reduce the power load per fuel rod by increasing number of the fuel rods in the fuel assembly by such method as changing the configuration of a fuel rods lattice from 8 lines by 8 rows to 9 lines by 9 rows etc.

In view of the two aspects described above, increasing of the number of fuel rods in the fuel assembly by changing the configuration of the fuel rods lattice and increasing of the H/U ratio by increasing of horizontal cross sectional area of the water rod or number of the water rods are a current trend in the fuel assembly for boiling water reactor.

For instance, in U.S. Pat. No. 4,781,885, a fuel assembly having a fuel rods lattice of 9 lines by 9 rows is disclosed, in which a large square water rod is installed at the central region which is equivalent to the 9 fuel rods arranged in a square lattice of 3 lines by 3 rows.

Further, in JP-A-1-196593 (1989), a fuel assembly having fuel rods in diamond lattice of which bearings to the internal wall of the channel box is 45° is disclosed, in which a cruciform large water rod is installed at the central region which is equivalent to a region for 12 fuel rods.

More plutonium is built up generally at the upper region of the fuel assembly as described above, especially in case of the flow rate spectral shift operation, much plutonium are built up. When the quantity of plutonium built up at the upper region of the fuel assembly is increased so much, it becomes difficult to maintain surely the margin of the reactor shut down at cold shut down. The difficulty is caused by increasing of the infinite multiplication factor with disappearance of voids at the upper portion of the reactor core at the cold shut down.

In order to solve the problem, in JP-A-64-88292 (1989), a plurality of water rods are installed at least in symmetrical positions to the diagonal line of the fuel assembly and fuel rods having shorter length in axial direction than the other fuel rods (partial fuel rod) are installed at least at the position between the water rods. In the fuel assembly, the void fraction of coolant at the space above the partial fuel rods where the fuel is not located, namely vanishing rods, becomes zero at the cold shut down of the reactor. The portion of the vanishing rod acts as a large water rod with the other water rods at the cold shut down. Therefore, the portion of the vanishing rod has an excessive neutron moderating effect and reversely a large neutron absorbing effect at the cold shut down. As the result, the difference between the infinite multiplication factors during the operation of the reactor and during the cold shut down becomes small, and shut down margin of the reactor is increased. Further, in the case of installing of the partial fuel rods, an additional effect such as reducing of pressure loss at two phase flow portion in the fuel assembly under the reactor operation is brought.

As described above, increasing of the H/U ratio by increasing of the number of fuel rods, and further, increasing of horizontal cross sectional area of the water rods or the number of the water rods are the current tendency.

Under such trend of the current technical development, a trial is performed which is aimed at high burnup by increasing the enrichment further. Such increment of the enrichment aiming at the increasing of the discharge burnup necessitates further enlarging of the horizontal cross sectional area of the water rods in order to make the H/U ratio the most proper. Nevertheless, as the horizontal cross sectional area of the large water rod is enlarged according to U.S. Pat. No. 4,781,885 and JP-A-1-196593 (1989), the pressure loss of the reactor core is increased by narrowing of the area of the coolant flow path which is formed between the fuel rods.

The increasing of the pressure loss of the reactor core is a problem mainly in following points.

(1) When the pressure loss of the reactor core is increased, the capacity of the pump has to be increased in order to compensate the increment. If the maximum flow in the reactor core is achieved by the maximum rotation of the pump under the condition without the increment of the pressure loss, the pump is not able to achieve the maximum flow in the reactor core when the pressure loss is increased.

(2) Stability is lowered by increasing of the pressure loss. That is, as the pressure loss of the two phase flow in the upper portion of the fuel assembly is larger than the pressure loss of the single phase flow portion, when entering flow to the fuel assembly is increased, the resistance at the two phase flow portion is increased in order to reduce the entering flow. When the entering flow is reduced, the resistance at the two phase flow portion is reduced and the entering flow is increased again. By repeating of the phenomena, vibration of the flow is caused in the fuel assembly, and the stability is lowered. The larger the pressure loss at the two phase flow portion is, the easier the vibration of the flow is caused.

On the other hand, the fuel assembly which is described in JP-A-64-88292 (1989) has a problem in aspect of fuel economy because optimization of the H/U ratio is not considered on the fuel assembly.

Further, in case of installing partial fuel rods, which has two advantages such as the reduction of pressure loss at two phase flow portion and the secureness of the reactor shut down margin into the fuel assembly for high burnup as described in JP-A-64-88292, fuel inventory is decreased. The reduction of the fuel inventory increases the number of reload fuel assemblies and causes problems such as increment of the number of generated spent fuel assemblies. One of the methods for solving the problem is enlarging the diameter of the fuel rod for keeping the same fuel inventory as before installing of the partial fuel rod. But the method causes another problem of increasing pressure loss which is accompanied with the reduction of flow path area for the coolant.

SUMMARY OF THE INVENTION

One of the objects of the present invention is to provide a fuel assembly which is able to optimize the H/U ratio without increasing of pressure loss of the reactor core for achieving high burn up, and an upper tie plate thereof.

Another object of the present invention is to provide a fuel assembly which enables partial fuel rods to be installed without increasing of the pressure loss of the reactor core and reducing of the fuel inventory.

The characteristic of the present invention to achieve the objects described above is in the fuel assembly having:

a plurality of fuel rods which are arranged in a lattice, a plurality of first means of water rods each of which has larger first cross sectional area than the area of a unit lattice of the fuel rods which corresponds to the each of the fuel rods described above and is arranged adjacently each other, first coolant flow path which is formed in a portion where is generated as an excessively moderated region in a second cross section when second means of water rods having the second cross section of same area as whole area of interior region of the outermost peripheral of a group of whole unit lattices of the fuel rods, which are occupied substantially by a plurality of the first means of water rods is assumed and also the second means of the water rods is assumed to be arranged in the fuel assembly instead of a plurality of the first means of water rods, and third coolant flow path connecting a plurality of the first means of water rods which are arranged substantially in the interior region in surrounding the first coolant flow path to second coolant flow paths which surround the first coolant flow path and the fuel rods and is located among the first means of water rods.

By the present invention, a fuel assembly having a plurality of fuel rods which are arranged in a square lattice and a means of water rods is provided. The fuel assembly is characterized in having a plurality of the fuel rods comprising a plurality of the first fuel rods which are arranged in square lattices of 10 lines by 10 rows except the central region where the fuel rods are able to be arranged in a lattice of 4 lines by 4 rows, four second fuel rods each of which is arranged at each of four corners of the central region respectively, and means of water rods comprising a plurality of the water rods having a large diameter which are arranged adjacently each other in a circle with intervals in the central region, wherein 12 fuel rods are able to be arranged, except four corner portions.

And, by the present invention, a fuel assembly having a plurality of fuel rods which are arranged in a square lattice and a means of water rods is provided. The fuel assembly is characterized in having a plurality of the fuel rods comprising a plurality of the first fuel rods which are arranged in a square lattice of 10 lines by 10 rows except the central region where the fuel rods are able to be arranged in a lattice of 4 lines by 4 rows, four second fuel rods each of which has a shorter axial length than the first fuel rod and is arranged at each of four corner portion of the central region respectively, and the means of water rods comprising a plurality of the water rods having a large diameter which are arranged adjacently each other in a circle with intervals in the central region, wherein 12 fuel rods are able to be arranged, except four corner portions.

Further, by the present invention, a fuel assembly having a plurality of fuel rods which are arranged in a square lattice and a means of water rods is provided. The fuel assembly is characterized in having a plurality of the fuel rods comprising a plurality of the fuel rods which are arranged in a square lattice of 10 lines by 10 rows except the central region where the fuel rods are able to be arranged in a lattice of 4 lines by 4 rows, four fuel rods each of which is arranged at each of four corner portions of the central region respectively, and the means of water rods comprising a plurality of spectral shift water rods of which internal liquid level are adjustable by control of the coolant flow in the reactor core, which are arranged adjacently each other in a circle with intervals in the central region wherein 12 fuel rods are able to be arranged except four corner portions.

Further, by the present invention, a fuel assembly having a plurality of fuel rods which are arranged in a square lattice and a means of water rods is provided.

The fuel assembly is characterized in having a plurality of the fuel rods comprising a plurality of the first fuel rods which are arranged in a square lattice of 10 lines by 10 rows except the central region where the fuel rods are able to be arranged in a lattice of 4 lines by 4 rows, and four second fuel rods each of which is arranged at each of four corner portions of the central region respectively, and installing the means of water rods in the central region wherein 12 fuel rods are able to be arranged except four corner portions in surrounding the center of the central region, and forming a coolant flow path which leads to the coolant flow paths which are formed around the fuel rods is formed at the center of the central region.

By the present invention, a fuel assembly having a plurality of fuel rods which are arranged in a square lattice and a means of water rods is provided. The fuel assembly is characterized in arranging a plurality of the fuel rods in a square lattice of 9 lines by 9 rows except the central region where the fuel rods are able to be arranged in a lattice of 3 lines by 3 rows, and having the means of water rods comprising four water rods having a large diameter which are arranged adjacently each other in a circle with intervals in the central region.

Further, by the present invention, a fuel assembly having a plurality of the fuel rods which are arranged in a square lattice of at least 9 lines by 9 rows and are able to achieve the average discharge burn up of at least 45 GWd/t, and a means of water rod which is arranged at the central region of the square lattice is provided. The fuel assembly is characterized in comprising the means of water rods which have enough cross sectional area of water rods to give sufficient H/U ratio to make the infinite multiplication factor almost be saturated under the core-average void fraction and are so installed as to surround the center of the central region, and forming a coolant flow path which leads to the outer region of the means of water rods at the center of the central region.

In order to achieve the objects described above, an upper tie plate comprising a plurality of first bosses each of which has a hole portion wherein upper end of the fuel rods is inserted, a plurality of second bosses each of which has a hole portion wherein upper end of the means of water rod is inserted, and a plurality of ribs each of which connects the bosses described above each other, is provided by the present invention. The upper tie plate is characterized in that the second bosses are installed at the center portion and that second opening which is formed among the four adjacent second bosses is larger than the opening which is formed among the four adjacent first bosses.

The inventors found that a fuel assembly having a plurality of fuel rods in a square lattice of 10 lines by 10 rows and a water rod which has a large cross sectional area (for instance, the water rod having such a horizontal cross section as to occupy a region wherein 12 fuel rods are able to be placed as disclosed in JP-A-1-196593 (1989)) has an infinite multiplication factor which is hardly changed even though the H/U ratio is altered around 4.5 by changing of the horizontal cross section of the water rod at the average void fraction of the reactor core in case of aiming at discharge burn up of 55-60 MWd/t and is saturated to the increasing of horizontal cross section of the water rod (refer to line AB in FIG. 2). The saturation of the infinite multiplication factor is revealed to be caused by formation of an excessively moderated region at center of the horizontal cross section of the water rod with increasing of area of the cross section.

The present invention is performed based on the finding described above, and the horizontal cross section of the water rod (simply called water rod area hereinafter) is so reduced as to optimize the H/U ratio of the fuel assembly by making the excessively moderated region, which is not contributable to improvement of moderating effect, an exterior region of the water rod, and further by making the region a coolant flow path wherein vapor-liquid two phase flow which leads to coolant path of around the fuel rods. Moreover, the present invention is aimed at reducing pressure loss of the fuel assembly by making the excessively moderated region the coolant flow path as described above.

That is, in the present invention, a plurality of the first means of water rods each of which has a larger first horizontal cross section than the area of the fuel unit lattice corresponding to each fuel rod are arranged adjacently each other. Here a second means of water rod which has the second horizontal cross section equivalent to the whole area of the interior region of the outermost periphery of a group of whole fuel unit lattices, which is substantially occupied by the first means of water rods is assumed. The second means of water rod has a large horizontal cross sectional area which generates the excessively moderated region as described above. Therefore, the first coolant flow path is formed at the portion where the excessively moderated region is generated, and a plurality of the first means of water rods are arranged around the first coolant flow path. And the third coolant flow path which connects the first coolant flow path and the second coolant flow path which surrounds the fuel rods is formed among the first means of water rods.

For instance, in the fuel assembly having a plurality of fuel rods arranged in a square lattice of 10 lines by 10 rows, a plurality of (for instance, four) water rods having a large diameter are arranged adjacently in a circle with intervals between each other respectively in the central region wherein 12 fuel rods are able to be arranged in a lattice of 4 lines by 4 rows except each of our corner portions (called the central region of 4 lines by 4 rows hereinafter). In case of arranging a plurality of water rods having a large diameter, the sum of the whole horizontal cross sectional area becomes smaller than the case when a large cruciform water rods is arranged in the region of the same area. The reduction of the total horizontal cross sectional area of the water rods is the result of exclusion of excessively moderated region in the saturated region of the infinite multiplication factor to the change of the H/U ratio. But, almost same infinite multiplication factor as the large cruciform water rods is obtained by the arrangement of a plurality of the water rods having a large diameter. The water rod having a large diameter has wider horizontal cross section than the area of a fuel unit lattice (refer to numeral 31 in FIG. 3), and has a larger outer diameter than the arrangement pitch of the fuel rods.

On the other hand, by replacing the large cruciform water rods with a plurality of water rods having a large diameter, coolant flow paths are formed in the region of water rods having a large diameter. As the water rods having a large diameter are arranged with intervals between each other, the coolant flow path leads to coolant flow paths around the fuel rods through the intervals. Therefore, such composition as described above reduces pressure loss in comparison with the case in which the large cruciform water rod is arranged.

Moreover, voids are flowed easily into the coolant flow path which is surrounded with each of the water rods from the coolant flow path which is formed around the fuel rods because the coolant flow path which is surrounded with a plurality of water rods is far from the fuel rods, which are heaters, and is surrounded with a plurality of water rods having a wider horizontal cross section than the fuel unit lattice, which are not heaters. Accordingly, in the upper region of the fuel assembly where the void fraction is high, void is gathered much to the coolant flow path which is surrounded with water rods, and consequently pressure loss of the fuel assembly is reduced.

By the reason described above, the present invention is able to achieve making the fuel high enriched and high burn up, and also is able to optimize the H/U ratio without increasing of the pressure loss.

In one of the examples of the present invention, each of four second fuel rods having short axial length is arranged at each of the four corner portions of the central region of 4 lines by 4 rows. In the case, as the coolant flow path which is surrounded with a plurality of the water rods having a large diameter reduces the pressure loss as described above, the increment of the pressure loss by increasing of the diameter of fuel rods is able to be compensated. Therefore, the arrangement of the partial fuel rods maintains certainly the effect of reduction of pressure loss and increment of shut down margin without reducing of the quantity of loaded fuel, and concurrently fuel economy is able to be improved.

When a plurality of the water rods having a large diameter are arranged adjacently each other in a circle, there is a possibility to cause fretting by flow vibration of each other of the water rods in the upper region of the fuel assembly where two phase current flows, but, by arrangement of the partial fuel rods, an operation area of a small camera for inspection of the fretting is provided in the upper region of the partial fuel rods 20 and inspection of the water rods can be performed easily during regular inspection.

In other example of the present invention, by using spectral shift water rods as the water rods having a large diameter, the fuel economy is further improved by the flow rate spectral shift operation.

Further, the inventors found the saturation phenomenon of the infinite multiplication factor by the arrangement of the water rods even in the fuel assembly having a plurality of fuel rods in a square lattice of 9 lines by 9 rows, and by arranging of the four water rods having a large diameter adjacently in a circle in the central region where the fuel rods are able to be arranged in 3 lines by 3 rows, the H/U ratio is optimized and the pressure loss is reduced similarly.

BRIEF DESCRIPTION OF THE DRAWINGS

FIG. 9 is a drawing illustrating comparatively the regular fuel rod and the partial fuel rod which are used in the fuel assembly of the second embodiment.

FIG. 11 is a drawing illustrating comparatively the regular fuel rod and two kinds of the partial fuel rods which are used in the fuel assembly of the third embodiment.

FIGS. 14A, 14B and 14C are drawings using for explanation of operation theory of the spectral shift water rod which is used in the fourth embodiment.

DETAILED DESCRIPTION OF THE PREFERRED EMBODIMENTS

The preferred embodiments of the present invention are explained with drawings hereinafter.

The first embodiment of the present invention is explained with reference to FIGS. 3-7.

The embodiment is aimed at increasing the average enrichment of the fuel assembly to about 5% by weight by arranging fuel rods in a square lattice of 10 lines by 10 rows and making the discharge burn up high to 55-60 GWd/t. The fuel assembly is used for boiling water reactors.

Figure 3:
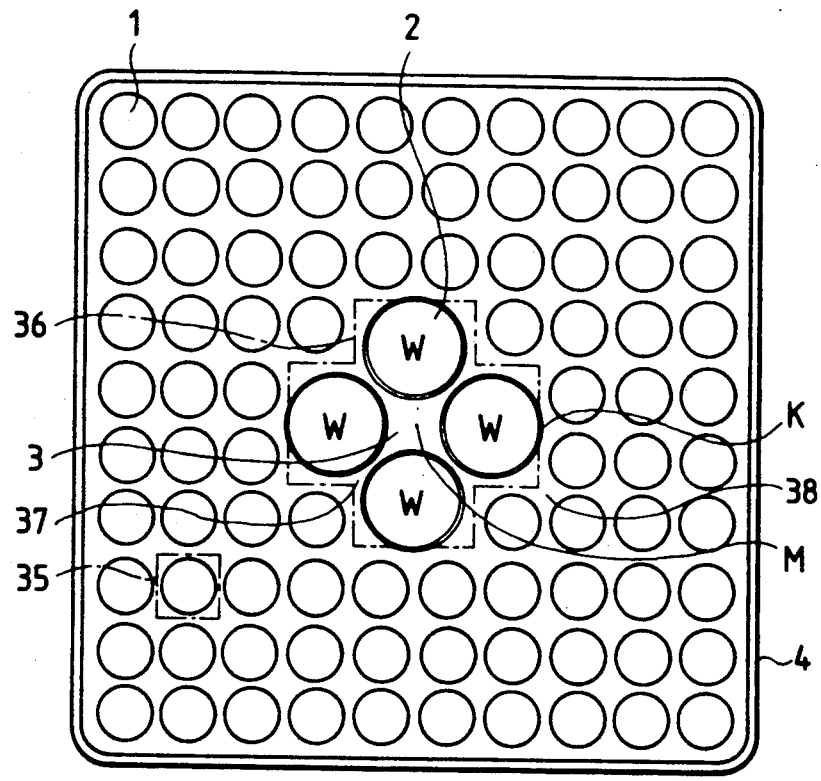
FIG. 3 is a cross section at III—III section in FIG. 4 of the fuel assembly which is the first embodiment of the present invention.

As shown in FIG. 3, the fuel assembly of the present embodiment has a plurality of fuel rods 1 which are arranged in a square lattice of 10 lines by 10 rows. In the fuel assembly, four water rods 2 having a large diameter, each of which has a circular horizontal cross section and is expressed by a letter "W" are arranged adjacently in a circular path with intervals 37 between each other in the central region of 4 lines by 4 rows except the four corner portions, wherein 12 fuel rods are able to be arranged. Each of the water rods 2 occupies a region equivalent to three fuel rods, and saturated water as coolant flows interior of the region. In other words, the group of 4 water rods having a large diameter 2 is substantially arranged in the region which is surrounded with a dotted chain line 36 and is able to be arranged in a group of 12 fuel unit lattices, that is, in the cruciform region which is interior of the one dotted chain line 36 expressing the outermost periphery of the group of 12 fuel unit lattices. But, strictly speaking, each of the water rods having a large diameter 2 crosses over at the part where is expressed by a letter "K" in FIG. 3 into the adjacent fuel unit lattice which locates in exterior of the dotted chain line 36 boundary. Nevertheless, as the cross over of the water rods having a large diameter is a very little, and the arrangement of the fuel rods 1 into the fuel unit lattices is not disturbed. Therefore, it can be said that the water rods 2 having a large diameter are arranged substantially in the interior of the dotted chain line 36.

The fuel unit lattice means a region which is formed in square surrounding a fuel rod 1 at the middle point between two adjacent fuel rods as shown by a dotted chain line 35. On side of the square is equal to the arranging pitch of the fuel rod 1.

At the center portion which is surrounded with four water rods 2 having a large diameter, the coolant flow path 3 is formed. That is, the water rods 2 having a large diameter locate around the coolant flow path 3. The coolant flow path 3 leads to the coolant flow path 38 which is formed around the fuel rods 1 through the gap 37 (a kind of coolant flow path) between two adjacent water rods 2. The bundle of the fuel rods 1 and the water rods 2 is surrounded with the channel box 4.

Figure 4:
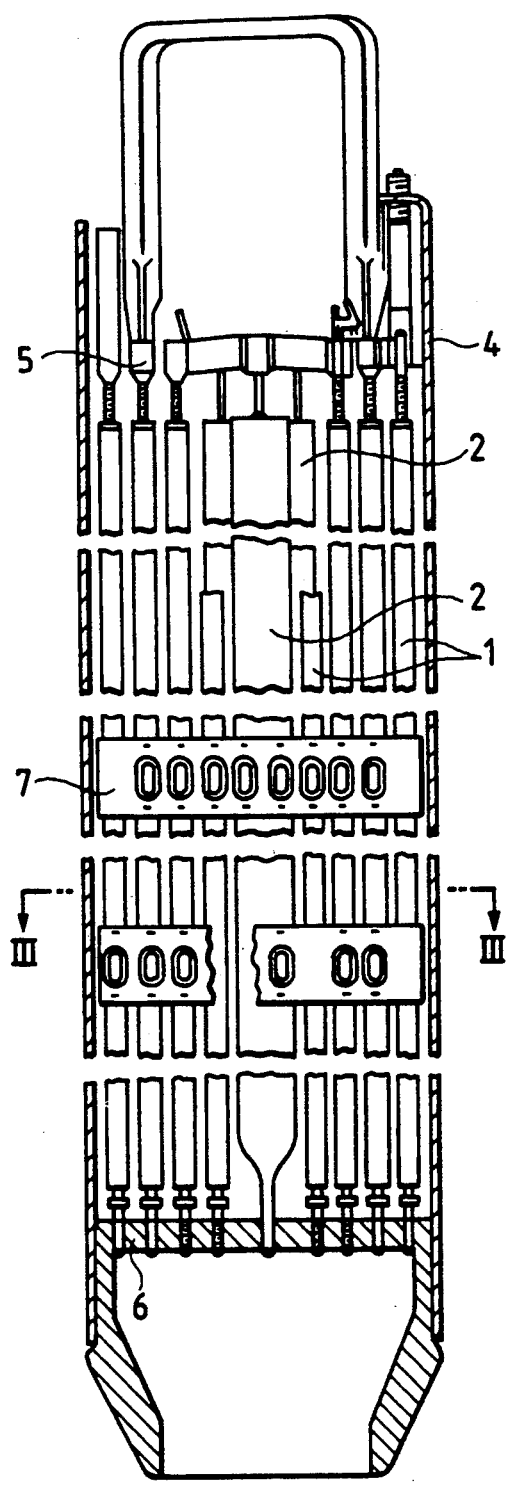
FIG. 4 is a vertical cross section of the fuel assembly of the first embodiment.

The whole composition of the fuel assembly in the first embodiment is illustrated in FIG. 4. The fuel rods 1 and the water rods 2 having a large diameter are supported with the upper tie plate 5 and the lower tie plate 6 by the upper end portion and the lower end portion respectively. The spacer 7 maintains the interval between fuel rods 1 each other at a designate width. A plurality of the spacers 7 are installed at several positions in axial direction of the fuel assembly. The channel box 4 surrounds the whole of the fuel bundle which is composed as described above.

Figure 5:
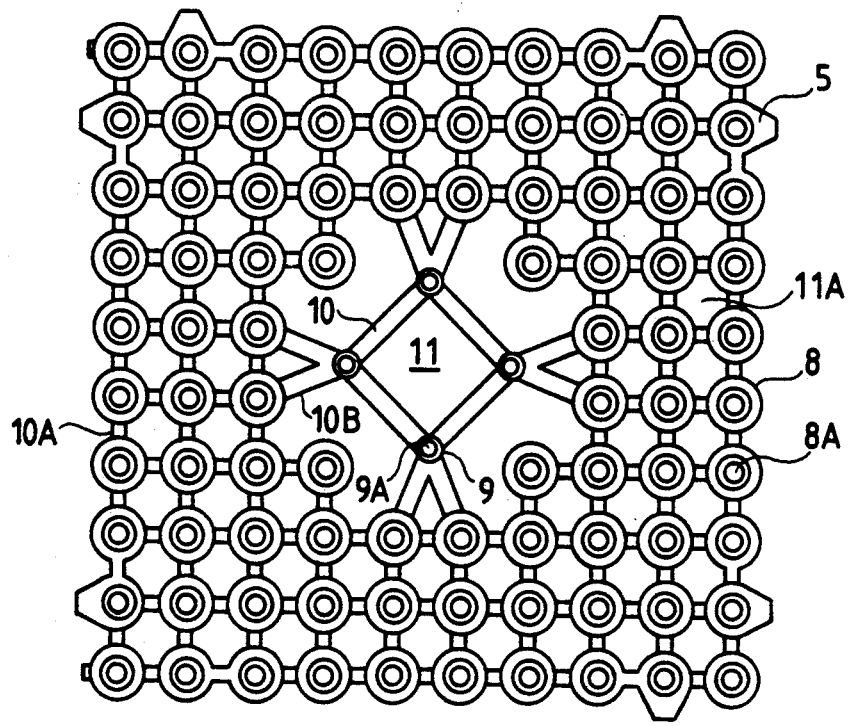
FIG. 5 is a top view of the upper tie plate in FIG. 4.

The upper tie plate 5 is provided, as shown in FIG. 5, with a plurality of bosses 8 each of which has a hole portion 8A to support the upper end of the fuel rod 1, four bosses 9 each of which has a hole portion 9A to support the upper end of the water rod 2 having a large diameter, ribs 10 to connect the bosses 9 each other, ribs 10A to connect the bosses 8 each other, and ribs 10B to connect the bosses 8 and the bosses 9. The opening 11 which is surrounded with the four ribs 10 locates at the upper portion of the coolant flow path 3 as described above, and is open. Therefore, the coolant flow path 3 leads to the upper portion of the fuel assembly through the opening 11. The area of the flow path of the opening 11 is larger than the area of the coolant flow path 3. Accordingly, the pressure loss of the upper tie plate 5 is reduced remarkably. Especially, as the opening 11 locates at an upward position of the coolant flow path 3, the two phase flow of the coolant and the vapor flows easily upward of the upper tie plate 5 through the coolant flow path 3. The area of the flow path of the opening 11 is larger than the area of the opening 11A which is surrounded with four ribs 10A.

Next, the operation of the present embodiment which is composed as described above is explained.

Figure 1:
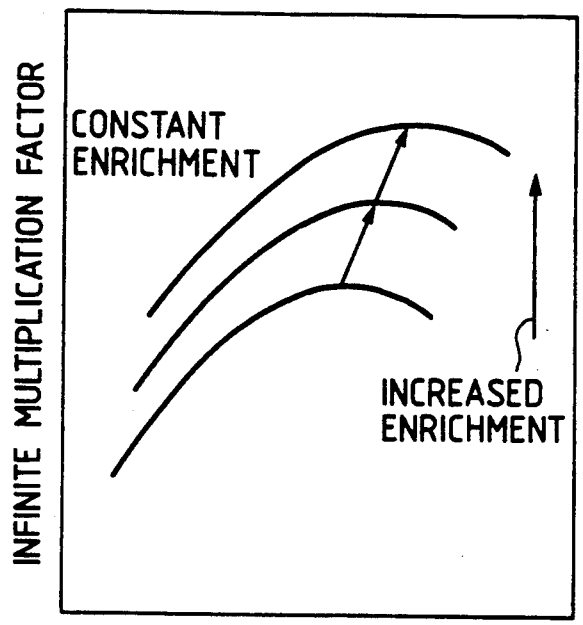
FIG. 1 is a graph showing the relation of the H/U ratio and infinite multiplication factor in a horizontal cross section of the fuel assembly with parameter of fuel enrichment.
Figure 2:
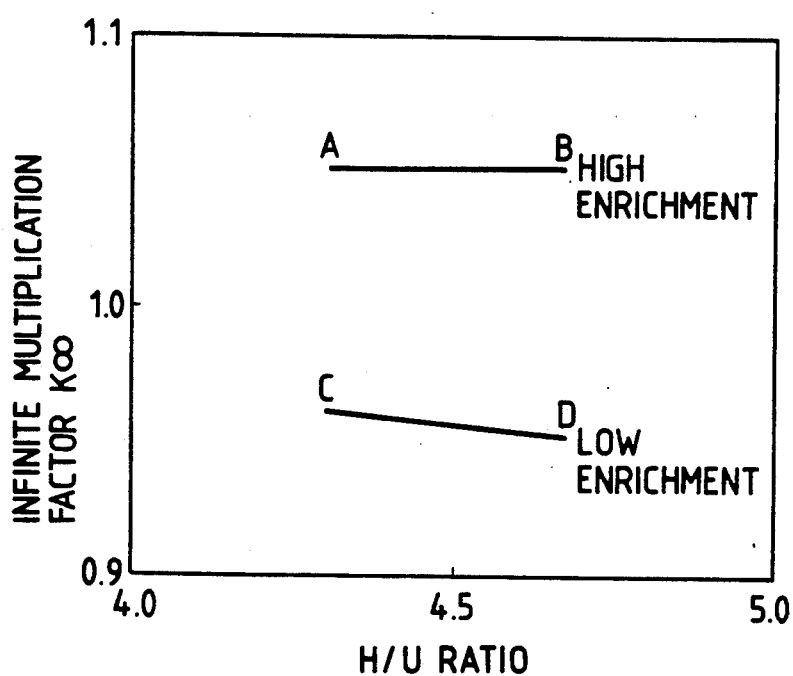
FIG. 2 is a graph for explanation of the saturation of the infinite multiplication factor to the change in the H/U ratio.

At first, the result of the study on dependence of the infinite multiplication factor of the fuel assembly to the H/U ratio with the fuel assemblies which are arranged in a square lattice of 10 lines by 10 rows is shown in FIG. 2. The characteristics is obtained by changing the horizontal cross sectional area of the water rod having the cruciform cross section as shown by the dotted chain line 36. The burn up is equivalent to the core averaged burn up at the end of the operation cycle of the reactor (about 35 GWd/t), and the void fraction is the core averaged void fraction (40%).

In FIG. 2, the line indicated as low enrichment is on about 4% by weight of fuel assembly averaged enrichment, and it is the same as the case of aiming discharge averaged burn up of 45-50 GWd/t. The line indicated as high enrichment is on about 5% by weight of fuel assembly averaged enrichment, and it is the same as the case of aiming at such high burn up as discharge averaged burn up of 55-60 GWd/t.

In the case of low enrichment, the infinite multiplication factor decreases as the horizontal cross sectional area of the water rod increases from the point C where the H/U ratio is less than 4.5 to the point D where the H/U ratio is greater than 4.5. It is caused that the quantity of water which is held by the water rod is much more than it is necessitated at the point D, and therefore, the effect of thermal neutron absorption by water in the water rod is great and loss of reactivity is yielded to the point C.

On the other hand, in the case of high enrichment, the infinite multiplication factor hardly changes even though the H/U ratio is changed around 4.5 from the point A to the point B or from the point B to the point A by changing of the horizontal cross sectional area of the water rod. That is, when the horizontal cross sectional area of a water rod becomes larger than an extent, an excessively moderated region is formed in the horizontal cross section. As the area of the excessively moderated region increases with increasing of the H/U ratio, the infinite multiplication factor is saturated with the increasing of water (moderator) in a range of the H/U ratio. But, when the area of the excessively moderated region is enlarged too much, the thermal neutron absorbing effect by water in the water rod increases and the infinite multiplication factor decreases as the same as the point D in the case of low enrichment.

As described above, in case of aiming at the average discharge burn up of 55-60 MWd/t, the reactivity is hardly changed by elimination of water in the excessively moderated region near the central portion of the water rods because the reactivity is saturated at the H/U ratio of about 4.5. That is, the reactivity is almost constant if the H/U ratio is about 4.5.

The present embodiment is the utilization of the new finding as described above, and aims at optimizing of the H/U ratio by reducing the horizontal cross sectional area of water rods in the region where the infinite multiplication factor is saturated to the change of the H/U ratio, and at reducing of the pressure loss by making the region, where the horizontal cross sectional area of water rods is reduced, a coolant flow path.

In the present embodiment, a cruciform water rod (a water rod of which size is depicted by the one dotted chain line 36) having the horizontal cross sectional area equivalent to the whole area of the region where is interior region of the outermost periphery (the one dotted chain line 36) of whole fuel unit lattices 35 (12 fuel unit lattices 35 in the present embodiment) which are substantially occupied with a group of the four adjacent water rods having a large diameter each other is assumed, and the coolant flow path 3 is formed at the excessively moderated region where is generated at the horizontal cross section of the assumed cruciform water rod when the cruciform water rod is arranged instead of the four water rods 2 having a large diameter. The excessively moderated region is formed at around the point M in FIG. 3. The point M is the axial center of the cruciform water rod which is depicted with the one dotted chain line 36.

Figure 6:
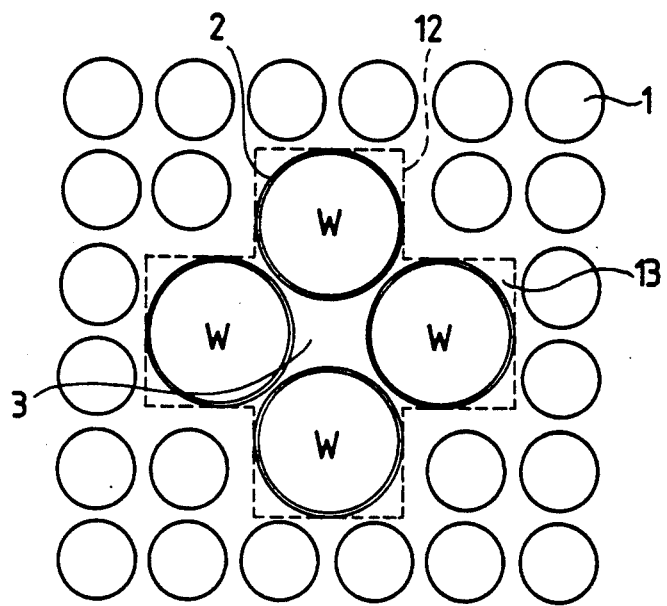
FIG. 6 and FIG. 7 are figures for explanation of operation of the water rods arrangement in the first embodiment of the present invention respectively.

When the four water rods 2 having a large diameter are arranged in a circle adjacently each other as the present embodiment, the total horizontal cross sectional area of water rods becomes smaller than the case in which a cruciform large water rod 12 contacting with the four water rods 2 of a large diameter at the central region is arranged as shown in FIG. 6. But as the result of the study by the inventors, it is revealed that the reduction of the horizontal cross sectional area of the water rods is equal to the change at the H/U ratio of about 4.5 as described above in FIG. 2, and that the four water rods 2 having a large diameter achieve almost same infinite multiplication factor as the cruciform large water rod 12 in the fuel assembly.

And, such arrangement of the four water rods 2 having a large diameter as described above forms the coolant flow path 3 and wider coolant flow path 13 as well between the water rod 2 having a large diameter and the adjacent fuel rod 1 than the case of the cruciform water rod 12. Consequently, the pressure loss is reduced.

Figure 7:
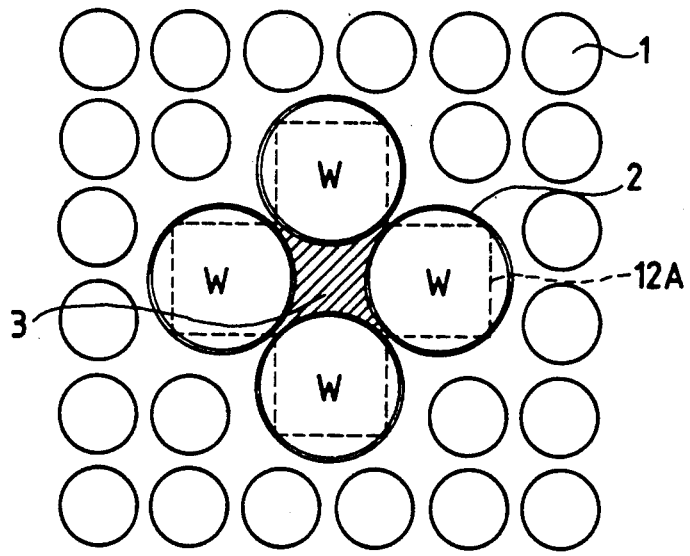

The present embodiment maintains the area of the coolant flow path not by reducing the size of the large water rod 12 shown in FIG. 6 to the size 12A shown in FIG. 7, but by dividing into four water rods 2 having a large diameter, arranging the water rods in a circle, and forming the coolant flow path 3 near the central portion of the circular arrangement. As the region of the coolant flow path 3 is far from the fuel rod 1, a heater, and is surrounded with water rods 2 which are not heater, the vapor-liquid two phase flow flows easily into the region from the surroundings. The effect of flowing the water with void easily into the region is larger than that of the coolant flow path between the large water rod 12A of reduced size and the adjacent fuel rod 1. Therefore, in the upper portion of the fuel assembly where is the region having high void fraction, the arrangement of the four water rods 2 as the present embodiment gathers more void at the central portion of the fuel assembly than the case of the arrangement of the large water rod 12A. That is, the vapor-liquid two phase flow including void (vapor) which is generated at the surroundings of the fuel rod 1 flows into the coolant flow path 3 and moves upwards in the path 3. In the cold shut down which is one of the shut down conditions of the nuclear reactor, the coolant flow path 3 acts with the four water rods 2 having a large diameter as a large water rod and shut down margin is increased even in the case of changing from high temperature condition (hot shut down) to room temperature condition (cold shut down) in the reactor shut down.

The evaluation as described above which is based on FIG. 2 is performed on the case of the reactor core averaged void fraction (40%), and at the middle of the fuel assembly in axial direction. But, the void fraction at the upper portion is higher. Accordingly, there is a possibility to make the infinite multiplication factor smaller at the upper portion of the fuel assembly than the value in FIG. 2. But, in the present embodiment, the four water rods 2 having a large diameter are arranged adjacently each other and as water (liquid) flows through the coolant flow path 3 which is surrounded with the water rods, and accordingly degree of reduction of the infinite multiplication factor at the upper portion of the fuel assembly is depressed. Consequently, the neutron moderation at the upper portion of the fuel assembly is performed effectively and power distribution in radial direction in the fuel assembly is improved.

As described above, by the present embodiment, making the fuel highly enriched (about 5% by weight) and high burn up (average discharge exposure is 55–60 GWd/t) is achieved and the optimization of the H/U ratio is possible without increasing of the pressure loss as well.

Also, the present embodiment has an effect that the four water rods 2 having a large diameter is manufactured easier than the described cruciform large water rods 12, 12A.

Further, the present embodiment is preferable in the aspect of the power distribution and productivity of the fuel assembly because of the preferable symmetrical arrangement of the four water rods 2 having a large diameter.

Figure 8:
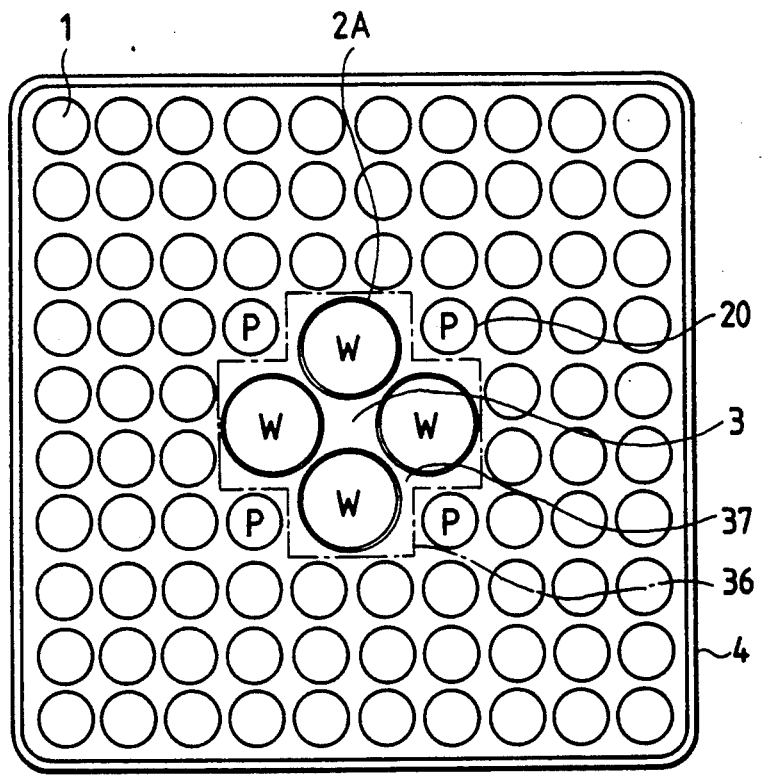
FIG. 8 is a horizontal cross section of the fuel assembly in the second embodiment of the present invention.

The second embodiment of the present invention is explained with FIGS. 8 and 9.

As shown in FIG. 8, the four partial fuel rods 29, each of which is expressed with a letter "P" and has shorter axial length than the regular fuel rod 1, are arranged at the four corner portions of the central region of 4 lines by 4 rows respectively in the fuel assembly of the second embodiment. Other composition of the second embodiment is same as the first embodiment. In the second embodiment, the four water rods 2A having a large diameter have somewhat smaller diameter than the water rod 2 having a large diameter in FIG. 3. Therefore, the water rods 2A are arranged within the region which has same area as the sum of the 12 fuel unit lattices 35 and is depicted with the one dotted chain line 36. In the second embodiment, it is possible to cross over into the exterior of the region which is depicted with the one dotted chain line 36 by making the diameter of the water rod 2A somewhat large as well as the first embodiment.

The partial fuel rod 20 is illustrated in FIG. 9 comparing with the regular fuel rod 1. The fuel rod 1 comprises a cladding tube 21 and end plugs 22, 23 which are welded hermetically to the upper and lower end portion of the cladding tube 21, wherein fuel pellets are inserted, respectively and are inserted into the upper and lower tie plates 5, 6 (refer to FIG. 4) respectively. The partial fuel rod 20 comprises a cladding tube 24, which is shorter than the cladding tube 21, and an end plug 25 having thread which is welded hermetically to the lower end of the cladding tube 24 and is fixed to the lower tie plate 6. The cladding tube 24 is inserted with fuel pellets inside and sealed hermetically at the upper end. The stack length of the fuel pellets (effective fuel length) in the partial fuel rod 20 is from 8/24 to 18/24 of that of the regular fuel rod 1.

In the second embodiment, as the fuel rods are not arranged at four corner portions, which are upward position of the partial fuel rods, in the horizontal cross section at the upper portion of the fuel assembly, the four water rods 2A having a large diameter, water in the coolant flow path 3 and water in the four corner portions act together as a large water rod at the cold shut down of the reactor. That is, the upper portion of the fuel assembly in the second embodiment has the same configuration as if a large water rod having rectangular cross section is arranged in the central region of 4 lines by 4 rows. Accordingly, the neutron absorbing effect of water at the central region is increased at cold shut down in the second embodiment. As the result, in the second embodiment, increasing rate of the infinite multiplication factor is decreased when density of the water is increased by changing from the hot operation to the cold shut down, hence, the shut down margin of the reactor is increased more than that in the first embodiment. And, the pressure loss of the two phase flow portion in the fuel assembly is larger than that of the single phase flow portion. In the second embodiment, as the partial fuel rods 20 are arranged, there is an effect to reduce the pressure loss further at the two phase flow portion where the pressure loss is large.

Further, effects described hereinafter are obtained by the second embodiment.

When the partial fuel rods 20 having two beneficial points such as the reduction of pressure loss at the two phase flow portion and certain maintenance of shut down margin of the reactor are arranged the total loading quantity of fuel (uranium) is decreased. The decrement of the loading quantity of fuel necessitates increment of the number of the replacing fuel assemblies and generates such problems as increment of the quantity of the spent fuel generation etc. To solve the problems, it is thought that the loading quantity of fuel is maintained as small as before the partial fuel rods arrangement by enlarging the diameter of the fuel pellet in the fuel rod. But, as enlarging of the diameter of the fuel pellet brings enlarging of the diameter of the fuel rod, the area of the coolant flow path which is formed between the fuel rods becomes narrower, and consequently such problems as the increment of pressure loss and the reduction of the cooling effect of the fuel rod etc. are caused.

In the second embodiment, as the four water rods 2 having a large diameter are arranged adjacently in a circle, the coolant flow path 3 at the central portion has a role of reducing of the pressure loss as explained in the first embodiment. Therefore, even though the diameter of the fuel rods 1 and 20 are enlarged, the increment of the pressure loss which is caused by the enlarging of the diameter is offset, and consequently, the decrement of the quantity of loaded fuel accompanying with the adoption of the partial fuel rod is able to be compensated by enlarging of the diameter of the fuel rods without increasing of the pressure loss. Accordingly, the effect of the reduction of pressure loss and the improvement of shut down margin of the reactor is maintained certainly, and concurrently improvement of the fuel economy by making the fuel high burn up can be achieved.

When the four water rods 2A are arranged adjacently in a circle as the present embodiment, there is a possibility to cause fretting by flow vibration of the water rods each other. That is the possibility to cause a flaw on the wall of the water rods by vibration and contacting of the water rods each other. In order to avoid such flaw caused by vibration on the water rods, the natural interval between the adjacent water rods is maintained by the spacers 7. This is same as the first embodiment. Nevertheless, it is needless to say that it is preferable if the portion is examinable in the regular inspection. In such case, it is impossible to examine the fuel assembly with disassembling in such period of the regular inspection as 2-3 months. Therefore, the examination with an inserted small camera for inspection such as a fiberscope etc. into the fuel assembly which is loaded in the reactor core is preferable. But in the case, when all of the fuel rods which are arranged adjacently to the water rods 2A are all regular fuel rods 1 as the first embodiment, it is difficult to examine the wall surface near the adjacent portion of the water rods 2 because the fuel rod 1 becomes barriers.

While, in the second embodiment, as the partial fuel rods are arranged facing to the interval 37 which is formed between the water rods 2 having a large diameter, the area of the coolant flow path near the adjacent portion of the natual water rods 2A having a large diameter is increased at the upward space of the partial fuel rods 20. Consequently operation region for the small camera of the fretting inspection is kept at upward space of the partial fuel rods and the examination of the outer surface of the water rods 2A can be performed easily during the regular inspection. As the upward space of the partial fuel rods 20 is the two phase region, the possibility of causing fretting is especially high and precise examination is required. Therefore, keeping of the operation region for the small camera is very effective in the improvement of the efficiency of the inspection.

Further, for the fuel assembly of high burn up, optimization of the H/U ratio in axial direction by increasing of the H/U ratio at the upper region is necessary. In the second embodiment, void is easily flowed into the coolant flow path 3 which is formed at the region where is surrounded with the four water rods 2A having a large diameter as described in the first embodiment. Moreover, as the upward region of the partial fuel rods 20 is low in pressure, void is easily flowed into the region. As the result, the region including the water rods 2A works as a quasi-water rod having a large diameter, and power distribution in radial direction is flattened. In axial direction, the quasi-water rod having a large diameter increases the H/U ratio at the upper region. Therefore, by the second embodiment, the H/U ratio in axial direction is optimized by the effect of the coolant flow path 3 at the central region and the partial fuel rods 20, and fuel structure which is suitable for high burn up fuel can be provided. The second embodiment also has same effects as the first embodiment.

Figure 10:
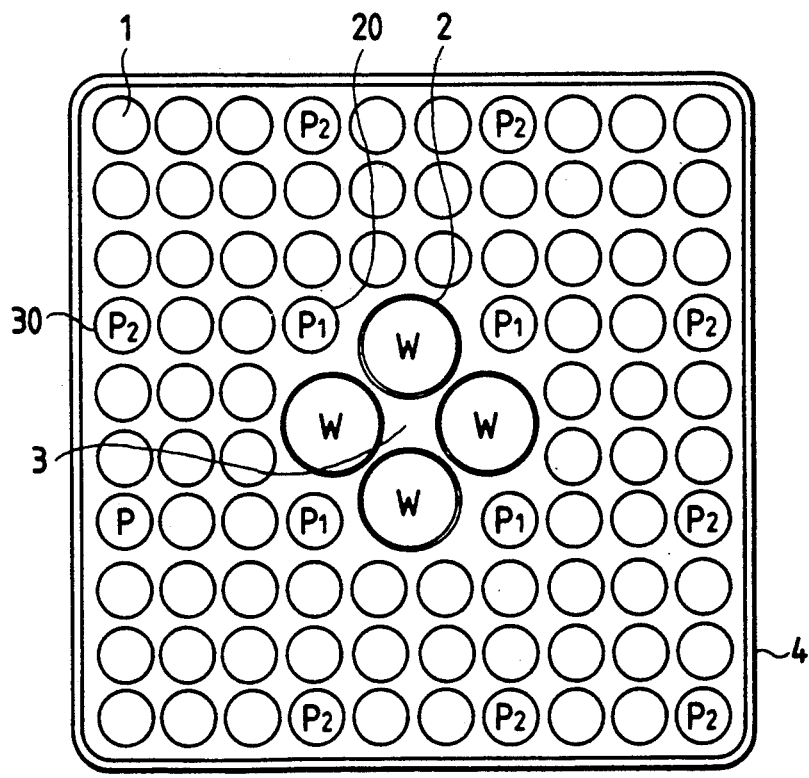
FIG. 10 is a horizontal cross section of the fuel assembly in the third embodiment of the present invention.

The third embodiment of the present invention is explained with FIG. 10 and 11.

In FIG. 10, the fuel assembly of the third embodiment is shown as same as the fuel assembly of the second embodiment except further nine partial fuel rods 30 are arranged at the outermost portion of the fuel rod arrangement in the fuel assembly. The axial length of the partial fuel rod 30 is selected depending on the object. The partial fuel rod 30 has same structure with the partial fuel rod 20. The effective length of the fuel in the partial fuel rod 30 is the length which excludes the upper region of the reactor core where the shut down margin is severe, that is, the length in the range of from 8/24 to 18/24 of the regular fuel rod 1.

When the partial fuel rods 30 are arranged, a large quantity of water exists at the outermost portion of the fuel rods arrangement as well as near the water rods 2 in the upper region of the fuel assembly. Therefore, the absorbed fraction of the neutron, which is moderated throughly at the water gap portion of the exterior of the channel box 4 in cold shut down, by water at the upward portion of the partial fuel rods 30 which are arranged at the outermost portion is increased. Accordingly, the difference between the infinite multiplication factors during the operation of the reactor and during the cold shut down thereof is less than the case of the second embodiment, and the shut down margin of the reactor becomes more certain.

In FIG. 11, an example that the length of the partial fuel rod 30 is different from that of the partial fuel rod 20 is shown.

In the reactor core which uses highly enriched fuel assembly for achievement of high burn up, the shut down margin of the reactor is less, and adoption of the partial fuel rods as one of the means to maintain certainly the shut down margin of the reactor is effective. But, the increment of the number of the partial fuel rods and shortening of the length of the partial fuel rods bring the reduction of the quantity of loaded fuel.

On the other hand, in view of the certain maintenance of the shut down margin of the reactor, the arrangement of the partial fuel rods at the outermost portion of the fuel arrangement is the most effective, and the arrangement at the adjacent portion of the water rod 2 is next effective.

In view of control of the maximum linear power and neutron measurement etc., the arrangement of the partial fuel rods in symmetry as possible is preferable. Accordingly, at the case of fuel rods arrangement of $10 \times 10$, the number of the partial fuel rods which are arranged at the outermost portion is preferably 8 rods, 2 rods per each side, or 4 rods at each of the corner portions. Although the fuel rod at the corner portions are effected remarkably with water in the water gap and are preferable for certain maintenance of the shut down margin of the reactor, sometime the reactivity loss may be caused. As the counteraction to the problem, the arrangement of the 8 partial fuel rods, 2 rods per side, as the first example of the composition of the present embodiment is preferable. But shortening of the fuel length reduces the quantity of the loaded fuel remarkably because the number of the partial fuel rods is as much as 8. While, in the second example of the composition of the present embodiment which uses the partial fuel rods 30 shown in FIG. 11, although 12 fuel rods are withdrawn at the upper portion where the shut down margin of the reactor is the most severe, only four fuel rods in the adjacent to the water rods 2 are withdrawn at the middle portion. In the second example of the composition, the length of the partial fuel rod 30 which is arranged at the outermost portion is longer than that of the partial fuel rod 20 of the middle portion. Accordingly, in the arrangement of the partial fuel rods for keeping symmetrical configuration and certain maintenance of the shut down margin of the reactor, there is an effect to make the quantity of the loaded fuel maximum concurrently with improving the shut down margin of the reactor.

Figure 12:
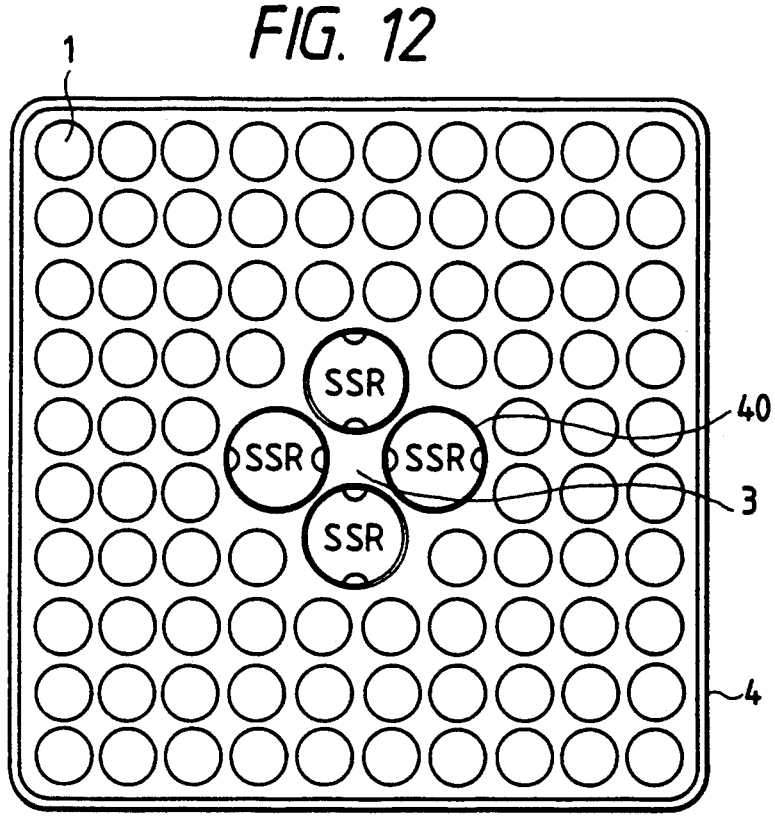
FIG. 12 is a horizontal cross section of the fuel assembly in the fourth embodiment of the present invention.
Figure 13:
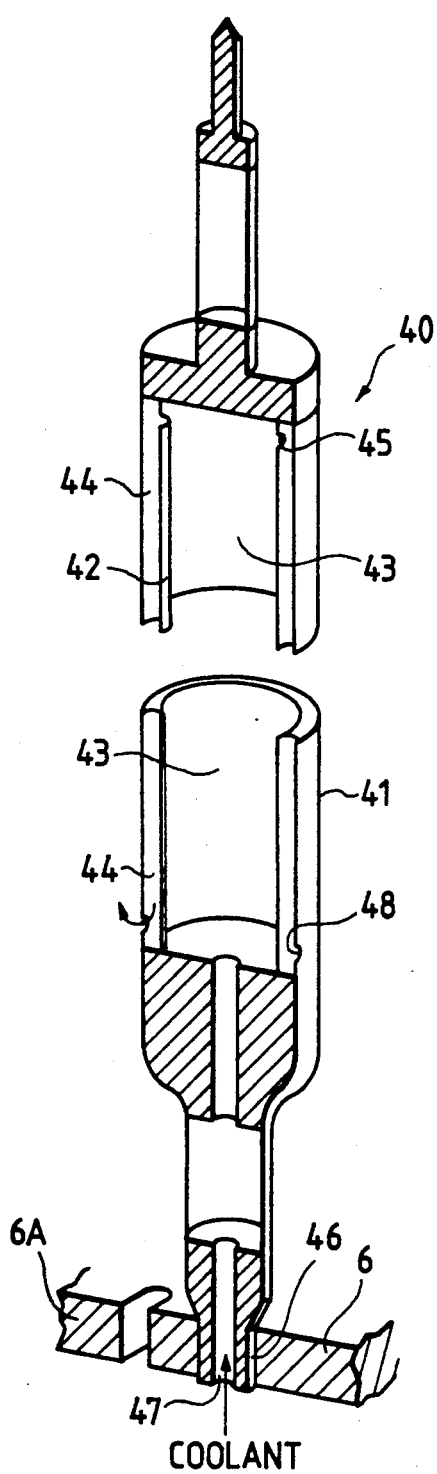
FIG. 13 is a perspective view of the vertical cross section of the spectral shift water rod which is used in the fuel assembly of the fourth embodiment.

The fourth embodiment of the present invention is explained with FIGS. 12-14.

As shown in FIG. 12, four spectral shift water rods 40 which are called by the acronym "SSR" are arranged instead of the four water rods 2 having a large diameter in the present embodiment. Here the spectral shift water rod means the water rod which is able to change the neutron moderating effect by changing the liquid level of the coolant in the water rod with controlling of the flow rate of the coolant in the reactor core. The spectral shift water rod is based on the invention which is disclosed in EP-A-0282600, line 1 of p. 9–line 7 of p. 31.

The structure of the SSR 40 is illustrated in FIG. 13. The SSR 40 comprises an ascending tube 41 which composes the body of the water rod and two descending tubes 42 which are installed inside of the ascending tube 41. The ascending tube 41 forms the flow path 43 for ascending of the coolant and the descending tube 42 forms the flow path for descending of the coolant. Both of the flow paths 43 and 44 are connected through the hole 45 which is provided near the upper end of the descending tube 42. A mouthpiece portion 46 which is inserted into the lower tie plate 6 is provided at the lower end portion of the ascending tube 41. At the moutpiece portion 46, an inlet 47 of the coolant ascending flow path is provided. The inlet 47 opens at the region which is lower than the fuel supporting portion 6A of the lower tie plate 6. And the mouthpiece portion 46 has thread portion for fixing to the fuel supporting portion 6A at outer circumference. On the other hand, an outlet 48 of the coolant descending flow path 44 is formed at the lower end portion of the coolant descending flow path 44. the outlet 48 opens at the region which is higher than the fuel supporting portion 6A. The fuel rod 1 is supported by the fuel supporting portion 6A with the lower end portion.

The operation principle of the SSR 40 is explained with FIGS. 14A-14C (refer to EP-A-0282600, line 1 of p. 9–line 23 of p. 12).

The figures illustrate the fundamental structure of the SSR 40. The fuel supporting portion 6A of the lower tie plate 6 which is located at the lower portion of the fuel assembly works as a resistant body to the flow of cooling water flowing into the coolant flow path which is formed between the fuel rods 1. The inlet 47 of the ascending tube 43 opens at the region which is lower than the resistant body, namely the fuel supporting portion 6A. The coolant descending flow path 44 reverses the cooling water flow, which ascends in the coolant ascending flow path 43, and leads downward. The cooling water flows into the coolant flow path which is formed between fuel rods 1 through the outlet opening at the higher region than the fuel supporting portion 6A. The fuel supporting portion 6A has a plurality of cooling water flow holes 49 which lead the cooling water to the coolant flow path. The cooling water flowing through the cooling water flow hole 49 does not flow through the SSR 40.

By changing the quantity of the cooling water flow which flows through the cooling water flow holes 49, the pressure difference $\Delta P(=P_1-P_2)$ between the lower region than the resistant body, namely the fuel supporting portion 6A, and higher region is changed. The pressure difference $\Delta P$ is proportional to almost the square of the quantity of the cooling water flow. For instance, when the quantity of the cooling water flow which flows through the fuel supporting portion 6A is changed from 80% of the rated flow quantity to 120%, the pressure difference $\Delta P$ becomes almost 2.25 times of the value at the 80% of the flow quantity.

On the other hand, cooling water in the SSR 40 generates heat by the action of the neutron and gamma ray, which are radiated from the fuel rods 1 being arranged around the SSR 40, and vaporizes. When the quantity of the cooling water which flows into the SSR 40 and the quantity of vaporization of the cooling water in the SSR 40 are balanced, a liquid level is formed in the coolant ascending flow path 43 as illustrated in FIG. 14A. The upper portion of the liquid level in the coolant ascending flow path 43 and internal portion of the coolant descending flow path 44 are filled with vapor. The vapor is blown out through the outlet 48 of cooling water. When the quantity of the cooling water passing through the fuel supporting portion 6A is increased further, the quantity of the cooling water which flows in becomes more than the quantity of vaporization of the cooling water and the liquid level in the coolant ascending flow path 43 is raised as illustrated in FIG. 14B. Finally, the cooling water in the coolant ascending flow path 43 is overflowed into the coolant descending flow path 44. When the quantity of the cooling water which flows in is increased much further, the cooling water is flowed out through the outlet 48 in a condition that boiling in the SSR 40 is suppressed considerably, that is, a condition that the void fraction is reduced remarkably. The interior portion of the coolant ascending flow path 43 and the coolant descending flow path 44 are filled with cooling water. The resistance coefficient of the fuel supporting portion 6A which is the resistant body against the cooling water supplied to the coolant flow path being formed between the fuel rods is so selected as to form a liquid level in the SSR 40 as illustrated in FIG. 14A.

Based on the phenomena described above, wide control of the void fraction is possible by control of the quantity of the cooling water flow. It means that the further remarkable change in the neutron moderating effect is brought by the flow rate spectral shift operation. That is, the effect of the spectral shift is increased remarkably and the fuel economy is improved further.

Accordingly, in addition to obtaining the same effect as the first embodiment, fuel economy is able to be improved further by making the fuel high burn up and by the flow rate spectral shift operation in the present embodiment.

Figure 15:
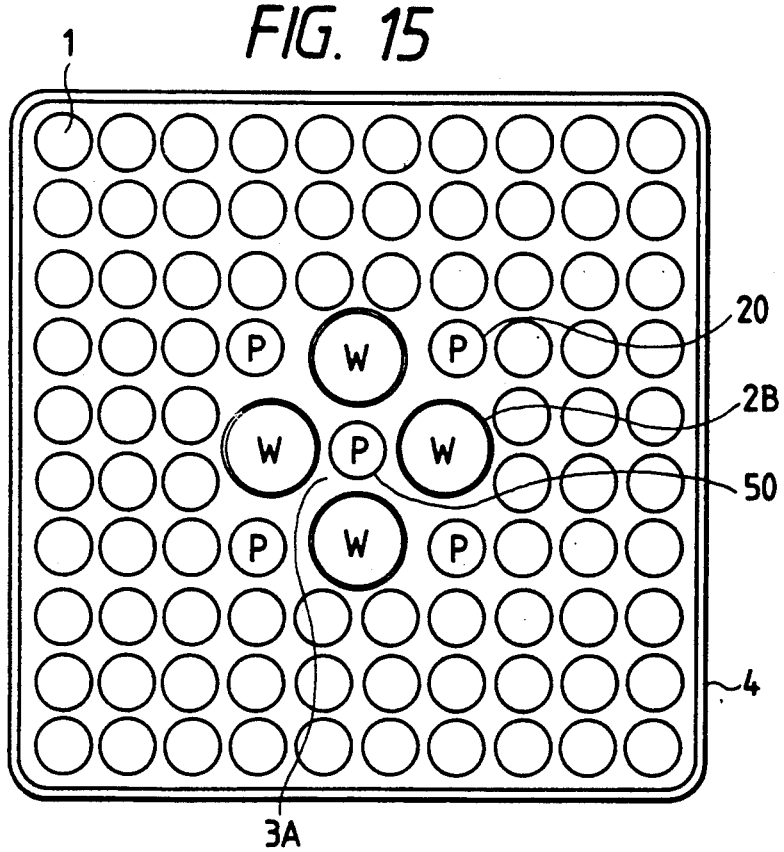
FIG. 15 is a horizontal cross section of the fuel assembly in the fifth embodiment of the present invention.
Figure 16:
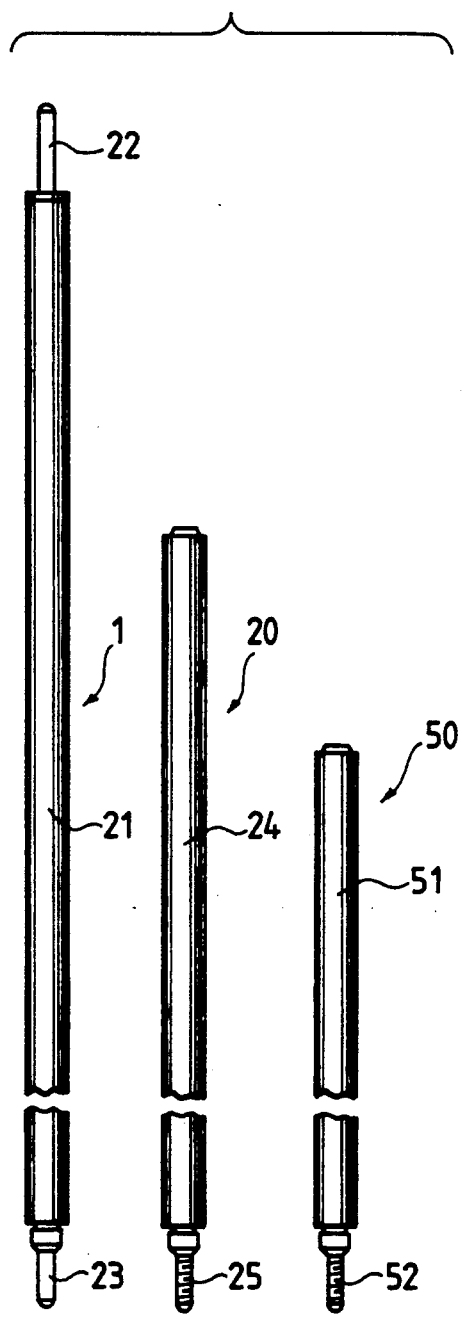
FIG. 16 is a drawing illustrating comparatively the regular fuel rod and two kinds of the partial fuel rods which are used in the fuel assembly of the fifth embodiment.

The fifth embodiment of the present invention is explained with FIG. 15 and 16.

In the fuel assembly of the fifth embodiment, four water rods 2B having a large diameter which is somewhat smaller than that of the water rods having a large diameter in the second embodiment shown in FIG. 8 are arranged adjacently in a circle in order to make the area of the coolant flow path 3A which is formed in a region surrounded with the water rods 2B having a large diameter wider somewhat than the coolant flow path 3 in the second embodiment, and the partial fuel rods 50 are arranged in the flow path 3A. Here, the decreasing from the total horizontal cross sectional area of the water rods 2B having a large diameter in the fifth embodiment to the total horizontal cross sectional area of the water rods 2A having a large diameter in the second embodiment is performed in the range of saturated condition in where the infinite multiplication is hardly changed with change in the H/U ratio as illustrated as the line A-B in FIG. 2. Other composition in the fifth embodiment is same as the second embodiment.

The partial fuel rod 50 is illustrated comparing with the regular fuel rod 1 and the partial fuel rod 20 in FIG. 16. The axial length o the partial fuel rod 50 is further shorter than the axial length of the partial fuel rod 20. The partial fuel rod 50 has substantially same composition as the partial fuel rod 20 except the axial length. The lower end portion of the cladding tube 51 is sealed hermetically with the end plug 52 having thread with which the end plug is fixed to the fuel supporting portion of the lower tie plate 6 (refer to FIG. 4). The stack length (effective length) of the fuel pellets in the partial fuel rod 50 is from 8/24 to 12/24 of the effective length of the regular fuel rod 1.

In the fifth embodiment, although the partial fuel rod 50 is arranged in the coolant flow path 3A, the pressure loss is large in the two phase flow region at the upper portion of the fuel assembly and the coolant flow path 3A still exists in the two phase flow region. Therefore, by the present embodiment, the effect of reducing of the pressure loss is obtained concurrently with making high burn up as same as the first embodiment. But the pressure loss in the fifth embodiment is increased more than that of the first embodiment by the arrangement of the partial fuel rods 50. Further, as void is easily flowed into the coolant flow path 3A which locates at upper region of the fuel assembly, optimization of the H/U ratio can be achieved as the same as the first embodiment.

And, by the present embodiment, the quantity of loaded fuel can be increased by the arrangement of the partial fuel rods 50.

Figure 17:
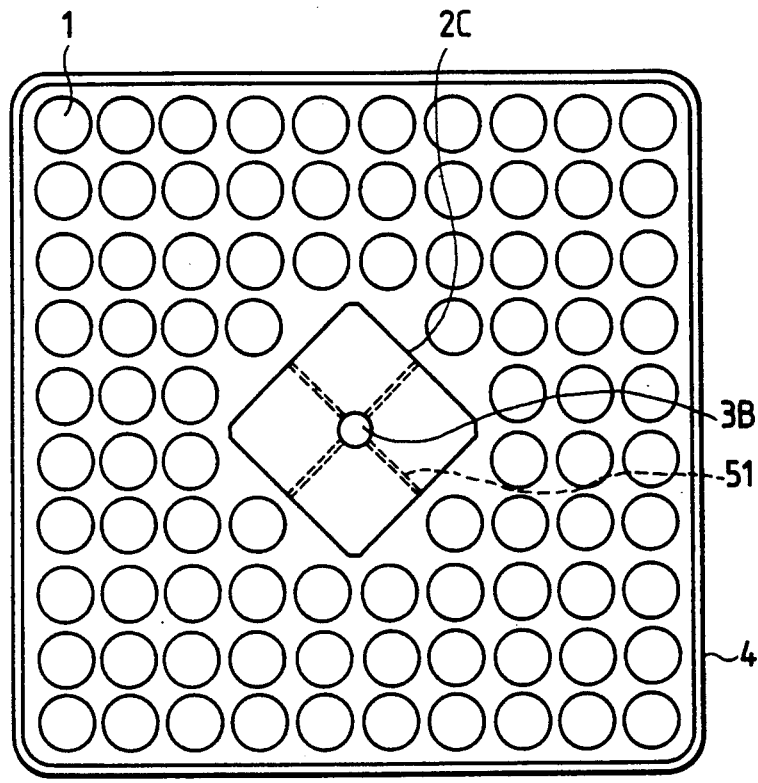
FIG. 17 is a horizontal cross section of the fuel assembly in the sixth embodiment of the present invention.

The sixth embodiment of the present invention is explained with FIG. 17.

The fuel assembly in the sixth embodiment is the same as the fuel assembly in the first embodiment in the point having a plurality of fuel rods 1 which are arranged in a square lattice of 10 lines by 10 rows, but is different in the point that a large water rod 2C having an external shape of which cross section is rectangular is arranged in the central region of 4 lines by rows except four corner portions, wherein the 12 fuel rods can be arranged. The coolant flow path 3B penetrating through in axial direction is formed at the axial center of the large water rod. The coolant flow paths 51 which connect the coolant flow path 3B and the coolant flow path surrounding the water rod 2C are formed in penetrating the water rod 2C horizontally at a plurality of axial positions. The coolant flow path 51 is separated from the region in the water rod 2C.

In the sixth embodiment which is composed as described above, the coolant flow path 3B works as the same as the coolant flow path 3 in the first embodiment. Therefore, the sixth embodiment is able to achieve high enrichment and high burn up of the fuel by arranging the fuel rods in a square lattice of 10 lines by 10 rows, and also is able to optimize the H/U ratio without increasing the pressure loss as the same as the first embodiment.

Figure 18:
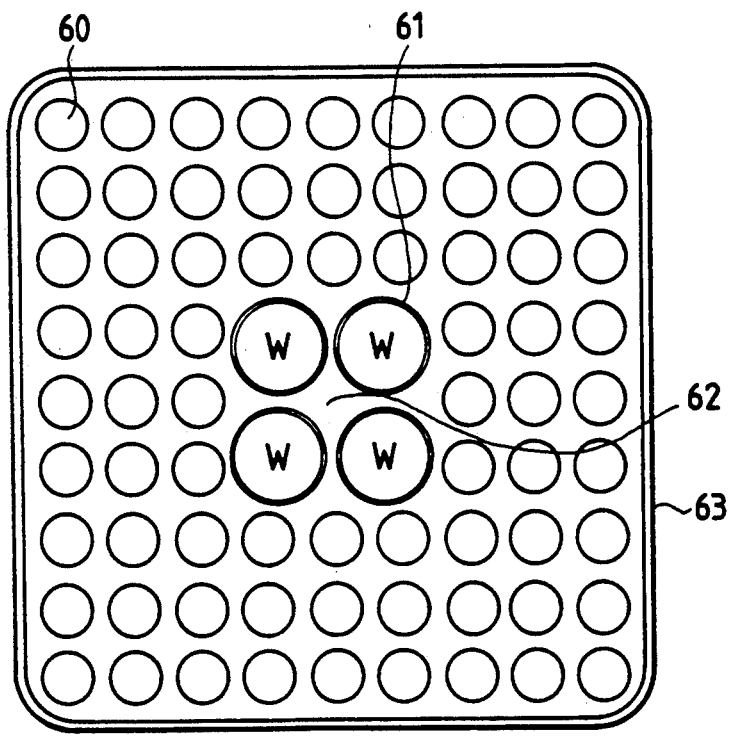
FIG. 18 is a horizontal cross section of the fuel assembly in the seventh embodiment of the present invention.

The seventh embodiment of the present invention is explained with FIG. 18.

The present embodiment is the case that the present invention is applied to the fuel assembly in which a plurality of fuel rods having the fuel rod averaged enrichment of about 4% by weight and average discharge burn up of 45–50 GWd/t are arranged in a square lattice of 9 lines by 9 rows.

The fuel assembly in the seventh embodiment has a plurality of fuel rods 60 which are arranged in a square lattice of 9 lines by 9 rows, and four water rods 61 having a large diameter and a circular cross section which are expressed with a letter "W" in FIG. 18 are arranged adjacently with intervals in a circle in the central region wherein fuel rods are able to be arranged in a lattice of 3 lines by 3 rows (called central region of 3 lines by 3 rows hereinafter). Each of the water rods 61 having a large diameter has a cross sectional area occupying the region equivalent to the 3 fuel rods. And the coolant flow path 62 is formed at the central region which is surrounded with the four water rods 61 having a large diameter. The coolant flow path 62 leads to the coolant flow path surrounding the water rods 61 through the intervals between the adjacent fuel rods. The fuel rods 60 and the water rods 61 having a large diameter is surrounded with the channel box 63.

In the first embodiment, it is explained that the infinite multiplication factor is hardly changed even though the water around the central region of the water rods is eliminated because the infinite multiplication factor is saturated at the H/U ratio of about 4.5 (FIG. 2) with the fuel assembly having the fuel arrangement of 10 lines by 10 rows and average discharge burn up of 55-60 MWd/t as an target. The inventors found that the fuel assembly having the fuel arrangement in a square lattice of 9 lines by 9 rows has the same characteristics. The seventh embodiment is based on the findings.

That is, with the fuel assembly having the fuel rods 1 in a square lattice of 9 lines by 9 rows, for instance as described in U.S. Pat. No. 4,781,885, a method in which the H/U ratio is increased by arranging a large square water rod in the central region from where 9 fuel rods of 3 lines by 3 rows are withdrawn is proposed. In the present embodiment, as four water rods 61 having a large diameter are arranged in a circular, total cross sectional area of the water rods is smaller than that of the square water rod. But, as the reduction in the area of the water rods is aimed as the change of the H/U ratio near 4.5 as described in FIG. 2, the four water rods 61 having a large diameter are able clearly to achieve clearly almost the same infinite multiplication factor as the square water rod.

Accordingly, the effects to optimize the H/U ratio by reducing the area of the water rods in the region where the infinite multiplication factor is saturated to the change of the H/U ratio, and to reduce the pressure loss by using the region in which the area of the horizontal cross section of the water rods is reduced as the coolant flow path 62 are brought in the present embodiment.

By the present invention, making the fuel high enriched and high burn up is achieved and the H/U ratio is able to be optimized without increasing of the pressure loss.

Also, by the present invention, the effects of reduction of the pressure loss by the adoption of the partial fuel rods, improvement in certain maintenance of the reactor shut down margin, and concurrent improvement in fuel economy can be achieved.

And, by the arrangement of the partial fuel rods, the operation region for a small cameral of fretting inspection is maintained, and the inspection of the water rods can be performed easily in the regular inspection.

Further, the power distribution in radial direction in the fuel assembly is flattened by the arrangement of the partial fuel rods, and the H/U ratio in axial direction which is preferable for fuel of high burn up can be provided by increasing of the H/U ratio at upper region in axial direction.

In the present invention, fuel economy is improved further by using the spectrum shift water rods as the water rods having a large diameter in the flow rate spectral shift operation.

Further, by the present invention, the optimization of the H/U ratio and the reduction of the pressure loss are achieved even with the fuel assembly having fuel rods which are arranged in a square lattice of 9 lines by 9 rows.

What is claimed is:

1. A fuel assembly comprising:
   a plurality of fuel rods arranged in a square 10×10 lattice other than at a central region thereof corresponding to a rectangular space for accommodating an arrangement of 4×4 fuel rods;
   four fuel rods arranged so that a respective one of the four fuel rods is disposed at each of four corner portions of the central region; and
   water rod means including one of a plurality of water rods and a plurality of spectral shift water rods being disposed in the central region, one of the plurality of water rods and the plurality of spectral shift water rods being arranged adjacent to and spaced form one another along a circular path so as to delimit intervals therebetween in the central region in a space of the central region other than the four corner portions for accommodating 12 fuel rods.

2. A fuel assembly according to claim 1, wherein a plurality of water rods are provided, each of the water rods having a large diameter.

3. A fuel assembly according to claim 1, wherein a plurality of spectral shift water rods are provided, each of the spectral shift water rods having an internal liquid level adjustment by control of coolant flow rate in a reactor core.

4. A fuel assembly according to claim 1, wherein one of the plurality of water rods and the plurality of spectral shift rods are arranged to surround a central portion of the central region and enable formation of a first coolant flow path which communicates with second coolant flow paths formed at fuel rods surrounding the central region.

5. A fuel assembly according to claim 4, wherein the first coolant flow path communicates with the second coolant flow paths through the intervals delimited between the water rod means.

6. A fuel assembly according to claim 1, wherein the plurality of fuel rods arranged in the square lattice includes at least first fuel rods and the four fuel rods arranged at the four corners of the central region are second fuel rods.

7. A fuel assembly according to claim 6, wherein the second fuel rods have a shorter axial length than an axial length of the first fuel rods.

8. A fuel assembly according to claim 2 wherein the plurality of fuel rods arranged in the square lattice includes at least first fuel rods and the four fuel rods arranged at the four corners of the central region are second fuel rods.

9. A fuel assembly according to claim 8, wherein each of the water rods has a large cross-section and a horizontal cross-sectional area corresponding to a cross-sectional area of three first fuel rods, the plurality of water rods including four water rods arranged along the circular path.

10. A fuel assembly according to claim 8, wherein the second fuel rods have a shorter axial length than an axial length of the first fuel rods.

11. A fuel assembly according to claim 8, further comprising an upper tie plate for supporting upper end portions of at least the first fuel rod, the upper tie plate delimiting an opening corresponding to a central portion of the central region delimited by the plurality of water rods arranged along the circular path.

12. A fuel assembly according to claim 8, wherein the fuel rods arranged in the square lattice further include third fuel rods, the third fuel rods having an axial length shorter than an axial length of the first fuel rods and being arranged in the outermost portion of the square 10×10 lattice.

13. A fuel assembly according to claim 12, wherein the fuel rods arranged in the square lattice include third fuel rods, the third fuel rods having an axial length longer than an axial length of the second fuel rods.

* * * * *